Nov. 25, 1924.

F. P. ANDERSON 1,517,144

DUST DETERMINATOR

Filed March 24, 1923

Inventor
F. P. Anderson
By Wilkinson & Giusta
Attorneys

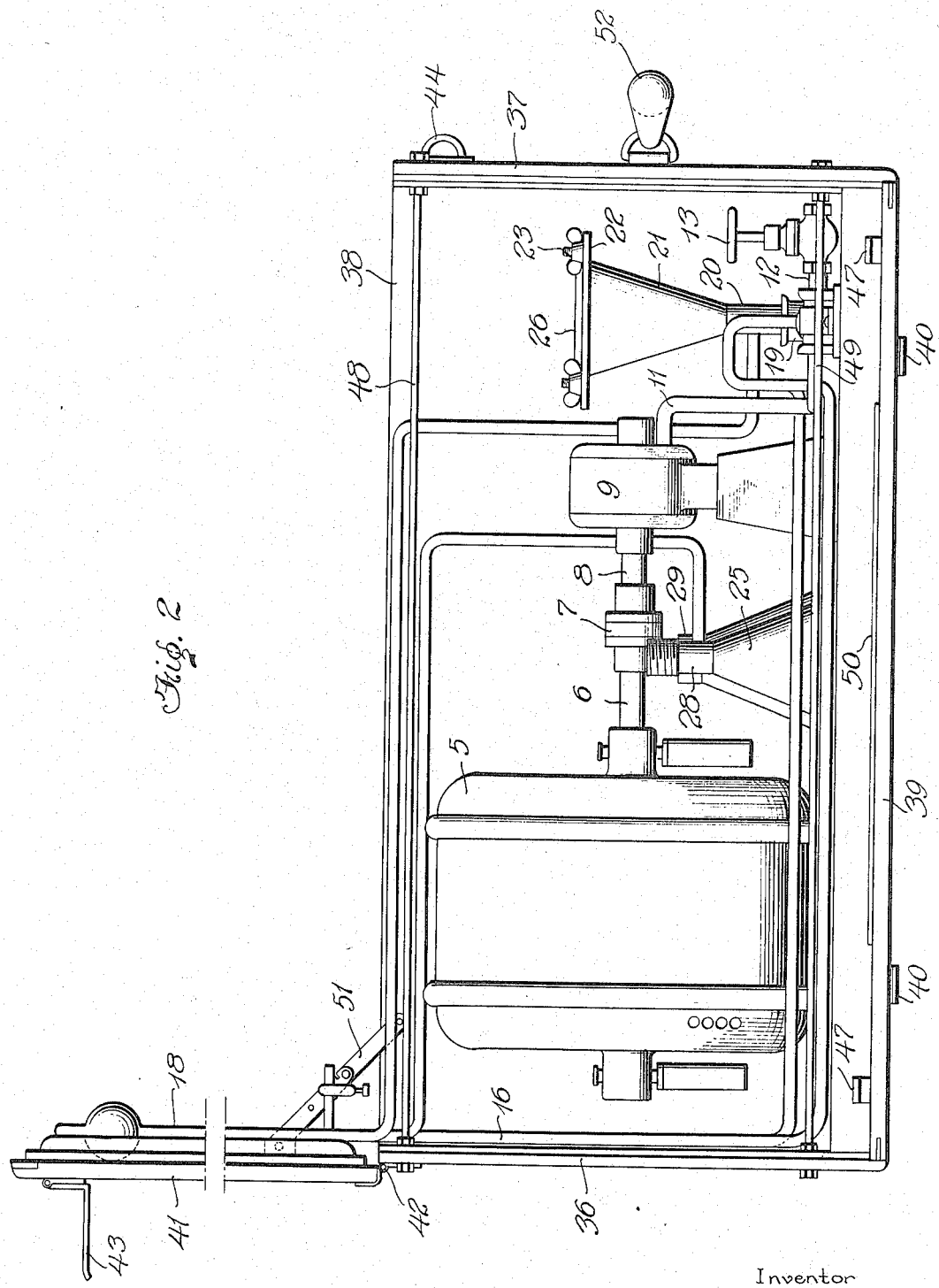

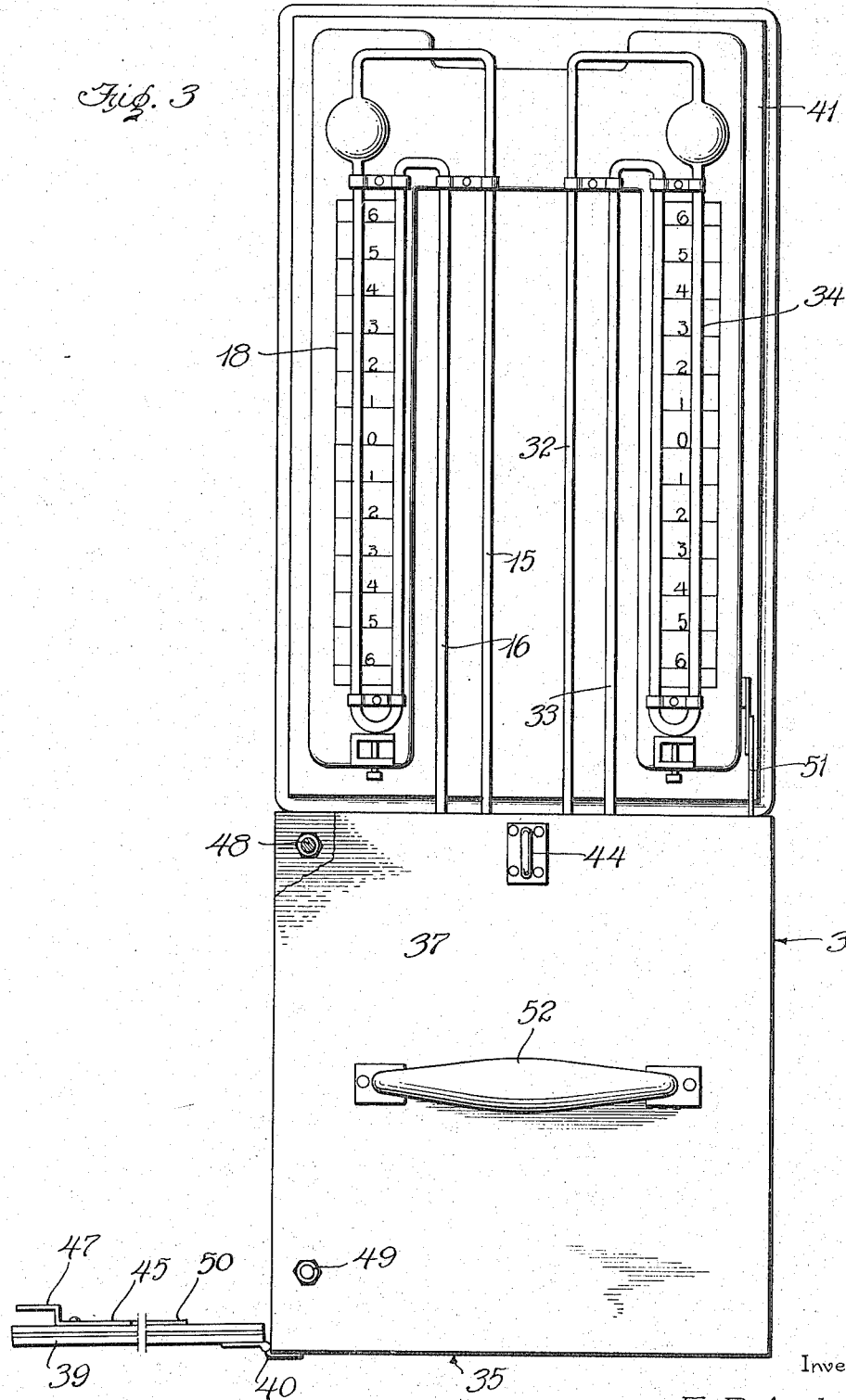

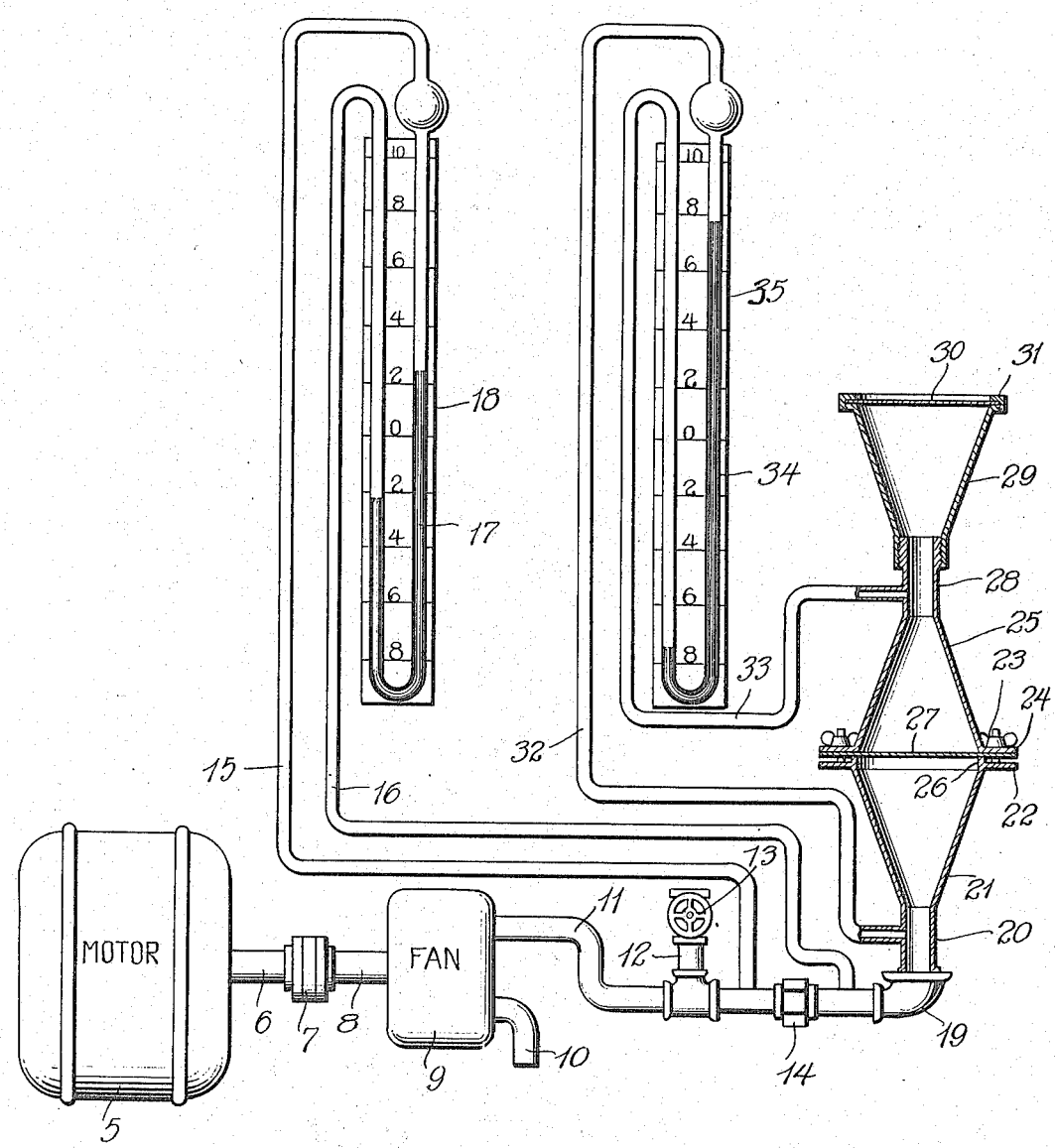

Patented Nov. 25, 1924.

1,517,144

UNITED STATES PATENT OFFICE.

FREDERICK PAUL ANDERSON, OF LEXINGTON, KENTUCKY.

DUST DETERMINATOR.

Application filed March 24, 1923. Serial No. 627,516.

*To all whom it may concern:*

Be it known that I, FREDERICK PAUL ANDERSON, a citizen of the United States, residing at Lexington, in the county of Fayette and State of Kentucky, have invented certain new and useful Improvements in Dust Determinators; and I do hereby declare the following to be a full, clear, and exact description of the invention, such as will enable others skilled in the art to which it appertains to make and use the same.

The present invention relates to improvements in dust determinators and refers to an instrument for detecting the presence of dust and other foreign matter in the atmosphere.

Up to the present time there has been no simple and accurate means of measuring the amounts of dust or foreign material in the air. All of the methods which have been used give only relative results and the various methods do not check each other. They require a skilled scientist to make the estimates and a long, tedious laboratory analysis is necessary. A large factor of error is induced by the personality of the operator.

It is an object of the present invention to provide a simple apparatus susceptible of use by a layman without sufficient training in which the results are obtainable without intermediate calculation and analysis, these results being shown on scales provided in conjunction with the apparatus. Tests show that the apparatus will check previous results, and both relative and absolute values can be obtained with it.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of the apparatus constructed according to the present invention with the cover lifted and the side wall let down.

Figure 2 is a side view of the same.

Figure 3 is an end view with the cover raised and the hinged side wall in closed position, and Figure 4 is a diagrammatic view showing the relative arrangement of the various parts.

Figure 1:
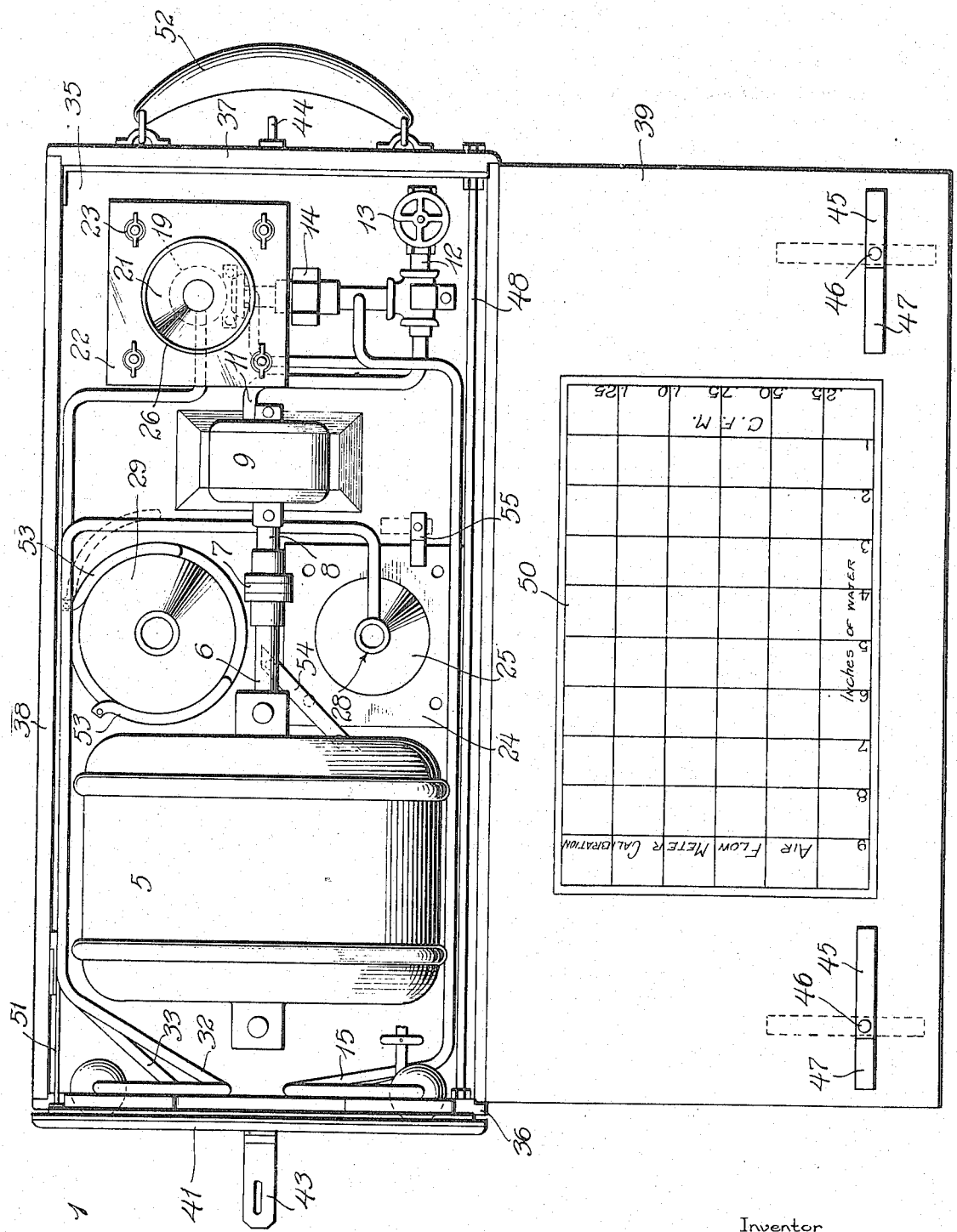

Referring first to this diagrammatic view shown in Figure 4, 5 designates an electric motor, the shaft 6 of which is connected by the coupling 7 to the shaft 8 of a fan 9. The fan exhaust is shown at 10 and the pipe or conduit 11 connects with the eye or intake of the fan.

At a point adjacent the fan 9, is an inlet pipe 12 connecting with the conduit 11 and in communication with the atmosphere. This inlet 12 is under the control of a hand operated valve 13. The conduit is coupled to an air flow meter nozzle 14 or rather the air flow meter nozzle is coupled directly in the conduit. Tubes 15 and 16, preferably of a flexible character, connect the conduit 11 at respectively opposite sides of the air flow meter nozzle with a gage which includes a U-shaped tube 17 mounted upon a scale 18. Within the U-shaped tube is a liquid as shown adapted to be displaced by the differential pressure of the air at opposite sides of the nozzle 14. This deflection of the liquid column in the U tube cooperates with the graduations upon the scale 18 to show accurately just what the pressure of the air is. The conduit 11 is provided with an elbow 19 just beyond the connection of the conduit with the tube 16 and this elbow 19 connects with the hollow shank 20 upon the lower section 21 of the test filter frame.

This lower section 21 is made in the form of a truncated cone in inverted position and at the upper or wider portion is a flange 22 for carrying bolts 23 by which the companion flange 24 at the base of the upper section 25 of the test filter frame, is secured to said flange 22. A raised shoulder 26 upon the lower section and above the flange is adapted to receive the diaphragm 27 of filter material which is held between the flanges and stretched across the widest portion of the test filter frame. The upper part of the upper section 25 leads into a reduced neck 28 which is provided with threads for removably receiving an extension inverted frusto-conical filter frame 29 having a diaphragm 30 of filter material stretched thereacross and held in place by the flanged ring 31 which is screw threaded to the upper end of the member 29. This diaphragm 30 communicates directly with the outside atmosphere or with the indoor atmosphere of a room or factory wherein the presence of dust or foreign matter is to be determined.

The shank 20 and the neck 28 are connected respectively by tubes 32 and 33 with a second gage of which 34 represents the U tube and 35 the graduated strip cooperating with the fluid in the U tube which is displaced by the differential pressures in the shank and neck.

Now the parts just described are adapted for convenience in transportation and use of the device to be contained within a box like holder having the base or bottom 35, the end walls 36 and 37, the fixed side wall 38 and the hinged side wall 39. The side wall 39 swings about the hinges indicated at 40 in Figure 3 and the top or cover 41 of the device is likewise hinged as indicated at 42 to the end wall 36. The cover is provided with a hasp 43 adapted to cooperate with a staple or eye 44 upon the end wall 37; a padlock being adapted to be passed through the staple in order to lock the cover in place. Incidentally this locking of the cover also locks the side wall 39, inasmuch as the side wall is provided with clips 45 pivoted upon the interior thereof as indicated at 46 and near the upper edge, such clips having off set ends 47 adapted to engage within the upper tie rod 48 which is connected between the end walls 36 and 37. These walls are also connected by a tie rod 49 near the bottom or base. These tie rods reinforce and strengthen the holder or container at the open side when the wall 39 is swung down as indicated in Figure 1. This wall may contain a chart 50 or a frame of brass or other material to hold sheets showing the calibration curve, etc.

The cover 41 is also provided with suitable braces 51 for admitting of the closing of the cover but adapted to hold said cover in an upright position, it being understood that the cover carries the two gages as clearly shown in Figure 3. With the cover assuming the upright position, the gages may be accurately and clearly read and in this vertical position they will render a faithful and reliable record.

The end wall 37 is provided with a handle 52 for convenience in carrying the device when the cover and side wall are closed. The motor and the fan are mounted in appropriate supports or upon appropriate pedestals within the container and upon the base, and the filter frame and its extenison are adapted to be disconnected, the extension part 29 being unscrewed from the neck 28, inverted and placed upon the bottom of the container at one side of the drive shaft 6. Hinged or pivoted keepers 53 may be provided upon the base 35 to grasp the flanges of this extension member 29 as shown in Figure 1.

In a like manner the upper section 25 of the filter frame is removed by unscrewing the nuts upon the bolts 23 and this section is placed upon the frame at the opposite side of the drive shaft, a corner brace 54 being adapted to receive one corner portion of the rectangular flange 24 while the pivoted keeper 55 upon the base engages an opposite corner whereby to prevent casual movement or rattling of the parts.

The use of the device will be better understood from reference to Figure 4. The electric motor 5 being put in operation, the shafts 6 and 8 are rotated and the fan 9 is put in motion. As a consequence air is drawn in through the conduit 11 and exhausted through the outlet 10. The fan thus serves to draw in air both through the extension filter frame 29 and through the inlet 12, it being understood that at the start of the test, the valve 13 is open at least partially. By a proper manipulation of this valve 13 more or less air may be allowed to enter through the inlet 12 and proportionately to the air entering at this point will the suction be diminished through the filter frame. The diaphragm 30 is preferably composed of three ply of chemical filter paper which cleans the air before it enters the extension funnel 29. This clean air is allowed to pass through the apparatus until an equilibrium of vapor pressures between the air and filter medium is established. Then this extension funnel 29 is removed by unscrewing from the neck 28 and the test proceeds as follows:—

The air is now drawn in directly to the neck 28 and the valve 13 is resorted to to control the amount of air drawn in through this neck. The air drawn in at 28 passes through the filter medium 27 and then through the reduced shank 20 to the conduit 11. The filter medium or diaphragm 27 will absorb moisture from the air or give up moisture to the air until there is a balance between the vapor pressure of the air and the vapor pressure of the filter medium.

This absorption or giving up of moisture will vary the resistance of the filter medium. For this reason the auxiliary filter or extension funnel 29 is used at the intake to allow only clean air to pass through the filter medium until a balance of vapor pressure is established. Now the static pressure in the air line acting through the neck 28 and tube 33 will tend to push the liquid down the left leg of the U tube 34, while the static pressure in the air line acting through the reduced tubular shank 20 and the tube 32 will have a contrary effect on the liquid in this same gage. If the static pressures on each side of the filter medium 27 are equal, they will act equally and oppositely and there will be no difference in levels of the liquid in the two legs of the gage 34. However, due to the resistance of the filter medium 27, the static pressure at the neck 28 is greater than the static pressure at the shank 20. The differences of the static pressures will produce a difference in level of the liquids in the tube legs. The difference in level of the liquid in the gage indicates the resistance of the filter medium. If the resistance of the medium stays constant, the volume of air drawn through the medium is constant and the differences in levels of the liquid will remain constant. During the test the volume of air drawn through the filter medium is held constant, and if there is foreign material in this air it will collect on the filter medium, changing the resistance of the filter medium, and this change will be indicated by the increase in the differences of the levels of the liquids in the U tube gage.

The nozzle 14 also restricts the flow of air in the conduit 11 and consequently the pressure is greater where the tube 16 connects with the conduit than it is at the opposite side of the nozzle and this difference in pressures is also controlled by the amount of air moving through the filter medium 27. The volume of air passing through the conduit and through the filter frame will thus be registered by the companion gage 17. The total air drawn in through the filter frame and through the inlet 12 passes to the fan 9 and is discharged at 10.

The data taken during a test gives the amount of air passed through the filter medium shown upon the gage 17; the resistance of the filter medium at the start, and at equal time intervals during the test this pressure difference being shown by the gage 34 and the length of time of the test is also taken into account.

Referring to calibrated curves on the kind of dust deposited, the total weight of dust corresponding to the obtained increase in filter resistance is determined. Dividing the total weight of dust by the total volume of air passed through the filter, the weight of dust per unit volume of air is obtained.

The filter medium may be compared to a scale of colors for relative values of dustiness. The filter medium contains the foreign matter collected from the air and can be used for laboratory analysis.

The use of the term "foreign matter" in the claims is to be understood as referring to any solid or liquid particles suspended in the air.

It is obvious that various changes and modifications may be made in the details of construction and design of the above specifically described embodiment of this invention without departing from the spirit thereof, such changes and modifications being restricted only by the scope of the following claims:—

What is claimed is:—

1. A dust determinator comprising a filter medium, means for maintaining a constant flow of air through said filter medium, and means for measuring the pressure difference across the filter medium.

2. A dust determinator comprising an enclosed filter medium, means for drawing air from the atmosphere through said filter medium whereby to deposit foreign matter from the air on said filter medium and thus check the flow of air therethrough, and means connected at opposite sides of said filter medium for indicating the pressure difference across the filter medium.

3. A dust determinator comprising a filter medium, means for maintaining a constant flow of air through said filter medium, means for regulating the pressure under which this constant flow takes place, and a pressure gage connected at opposite sides of said filter medium for showing the pressure difference.

4. A dust determinator comprising a filter medium, a fan operable to maintain an air flow through said filter medium, an inlet for the fan independent of the filter medium, a valve for controlling the flow through said inlet and thereby regulating the current of air drawn in by the fan through said filter medium, a pressure gage, an air flow meter positioned to receive the air after passing through said filter medium, and means connecting the pressure gage to opposite sides of said filter medium.

5. A dust determinator comprising a filter medium, a fan having its inlet communicating with said filter medium and directly with the atmosphere, means for regulating the flow of air directly from the atmosphere to said fan, a pressure gage for showing the difference in pressures across said filter medium and an air flow meter receiving the air after passage through said filter medium.

6. A dust determinator comprising a filter frame, a filter medium therein, a pressure gage having connections to said filter frame at opposite sides of the filter medium, an air flow meter connected to said filter frame, and a source of suction connection to said air flow meter and to the filter frame.

7. A dust determinator comprising a filter frame having reduced ends and an enlarged central portion, a filter medium stretched across the enlarged central portion, a pressure gage having opposite parts connected to the reduced ends of said filter frame, and a source of suction in communication with said filter frame.

8. A dust determinator comprising a filter frame composed of a pair of frusto-conical sections having their larger ends fitted together, a filter medium stretched between the sections, a pressure gage connected to the reduced portions of said sections, and means for creating a suction of air through said sections and filter medium.

9. A dust determinator comprising a filter frame provided with an inlet and an outlet and having a filter medium therein, a pressure gage connected across said filter medium, an extension frame removably connected to the inlet end of said filter frame and having a filter medium therein, and a source of suction connected to the outlet of said filter frame.

10. A dust determinator comprising a filter frame provided with an inlet and an outlet and having a filter medium stretched thereacross, a pressure gage connected across said filter medium, an extension filter frame having a filter medium therein and removably connected to the inlet of said filter frame, a conduit connecting with the outlet of said filter frame, a flow meter in said conduit, an inlet to said conduit from the atmosphere, a valve in the conduit inlet, and a source of suction connected with the conduit.

11. A dust determinator comprising a casing having a hinged side and a hinged cover, means for securing said cover and side in place, pressure and flow meter gages carried by said cover, means for creating suction carried within said casing, a filter frame adapted to be carried within said casing and including a removable section and a removable extension frame, means for connecting said filter frame with the pressure gages, means connected with the source of suction and filter frame, to check the flow, the flow meter gage being connected across said means, and means for regulating the amount of air drawn through said filter frame.

12. The method for determining the amount of foreign matter suspended in a unit volume of air, which consists in drawing air under pressure through a filter medium whereby to deposit the foreign matter upon the filter medium and thus proportionately to decrease the flow of air through said filter medium, and taking a reading of the difference in pressure across said filter medium.

13. The method for determining the presence and amount of foreign matter in the air, which consists in creating a flow under pressure of air through a filter medium whereby to deposit foreign matter upon the medium which proportionately resists the flow of air therethrough, taking the pressure difference across said medium, and taking the rate of flow of air through the filter medium.

FREDERICK PAUL ANDERSON.